US008117664B2

(12) United States Patent
Johnson et al.

(10) Patent No.: US 8,117,664 B2
(45) Date of Patent: Feb. 14, 2012

(54) RADIO-TYPE INTERFACE FOR TUNING INTO CONTENT ASSOCIATED WITH PROJECTS

(75) Inventors: Bruce Johnson, Woodinville, WA (US);
Anoop Gupta, Woodinville, WA (US);
Paul J. Hough, North Bend, WA (US);
Pavel Curtis, Bellevue, WA (US);
Richard J. McAniff, Bellevue, WA (US); Raymond E. Ozzie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 11/770,671

(22) Filed: Jun. 28, 2007

(65) Prior Publication Data
US 2009/0007230 A1    Jan. 1, 2009

(51) Int. Cl.
*G06F 7/04* (2006.01)
(52) U.S. Cl. .................. 726/27; 726/2; 725/37; 725/38; 725/60; 725/61
(58) Field of Classification Search ............... 726/2, 27; 725/58–135, 37, 38; 707/104
See application file for complete search history.

(56) References Cited

U.S. PATENT DOCUMENTS

| 6,466,940 B1* | 10/2002 | Mills ..................................... 1/1 |
| 6,529,804 B1 | 3/2003 | Draggon et al. |
| 6,594,682 B2* | 7/2003 | Peterson et al. ............... 718/102 |
| 6,608,963 B1* | 8/2003 | Yuen et al. ....................... 386/46 |
| 6,621,502 B1* | 9/2003 | Nair et al. ....................... 715/716 |
| 6,721,781 B1* | 4/2004 | Bates et al. .................... 709/203 |
| 6,873,710 B1* | 3/2005 | Cohen-Solal et al. ......... 382/100 |
| 6,981,246 B2* | 12/2005 | Dunn .............................. 717/127 |
| 7,076,661 B2 | 7/2006 | Chen et al. |
| 7,222,163 B1* | 5/2007 | Girouard et al. ............... 709/219 |
| 2001/0034219 A1* | 10/2001 | Hewitt et al. ............... 455/186.1 |
| 2001/0048736 A1 | 12/2001 | Walker et al. |
| 2002/0059614 A1 | 5/2002 | Lipsanen et al. |
| 2002/0059619 A1 | 5/2002 | Lebar |
| 2002/0072326 A1* | 6/2002 | Qureshey et al. ............ 455/3.02 |
| 2003/0139980 A1 | 7/2003 | Hamilton |
| 2003/0186704 A1 | 10/2003 | Tamura et al. |
| 2003/0221194 A1 | 11/2003 | Thiagarajan et al. |
| 2004/0148344 A1* | 7/2004 | Navar et al. .................... 709/203 |
| 2005/0055718 A1 | 3/2005 | Stone |
| 2005/0108766 A1* | 5/2005 | Hlasny et al. ................. 725/100 |
| 2006/0089544 A1* | 4/2006 | Williams et al. .............. 600/300 |
| 2006/0190980 A1* | 8/2006 | Kikkoji et al. ................ 725/114 |

(Continued)

OTHER PUBLICATIONS

Eoin Brazil, et al. Interactive Radio: Exploring Visitor Stories using a Radio Interface. Jul. 2004. http://www.idc.ul.ie/data/publications/28.pdf.

(Continued)

*Primary Examiner* — Nabil El Hady
(74) *Attorney, Agent, or Firm* — Lee & Hayes, PLLC

(57) ABSTRACT

A user can receive content relating to a common topic, such as a project, through a radio-type interface. A frequency or other indicator associated with the project can be selected on a user device. The common topic can be presented to the user, based on the selected frequency and/or an authentication. Presented information can also be provided in a common format requested by the user or as a function of the rendering device. The common format can be facilitated by a conversion component that can change information from a first format to at least a second format. The information can also be presented in more than one format.

11 Claims, 10 Drawing Sheets

U.S. PATENT DOCUMENTS

| | | | |
|---|---|---|---|
| 2006/0212531 A1* | 9/2006 | Kikkawa et al. | 709/217 |
| 2006/0218191 A1* | 9/2006 | Gopalakrishnan | 707/104.1 |
| 2007/0008956 A1* | 1/2007 | Moran et al. | 370/352 |
| 2007/0169159 A1 | 7/2007 | Aaby et al. | |
| 2007/0213980 A1* | 9/2007 | Danner et al. | 704/231 |
| 2007/0260213 A1* | 11/2007 | Williams et al. | 604/500 |
| 2008/0209514 A1* | 8/2008 | L'Heureux et al. | 726/3 |
| 2008/0244660 A1* | 10/2008 | Wodka et al. | 725/58 |

OTHER PUBLICATIONS

Katsaros Constantinos. Data Management in Mobile Environments. http://mm.aueb.gr/research/daimon/MobileDataManagement.pdf. Last accessed on Sep. 4, 2007.

Dik Lun Lee, et al. Data Management in Location-Dependent Information Services. http://www.cse.psu.edu/~wlee/Publications/wlee%020PVC02.pdf. Last accessed Sep. 3, 2007. pp. 65-72.

* cited by examiner

RADIO-TYPE INTERFACE FOR TUNING INTO CONTENT ASSOCIATED WITH PROJECTS

BACKGROUND

Wireless mobile technology has become widespread and is utilized for both personal as well as business uses. Mobile devices such as telephones, pagers, personal digital assistants (PDAs), data terminals, etc. are designed to be carried by those who travel from place to place in the daily course of business, for personal reasons, or for both business and personal reasons. It is also becoming more common for users of mobile devices to utilize such devices in place of conventional wired systems. If fact, many users rely solely on mobile devices to communicate information and no longer have a traditional wired computing system.

The appeal of mobile devices is due in large part to the convenience of having such devices available regardless of where the user may be located (e.g., at home, at work, traveling, out of town, and so on). In such a manner, users can easily stay "connected". Such computing devices can be accessed at almost any time and any place and can contain a tremendous amount of information relating to people, organizations, general interests, etc. Electronic storage mechanisms have enabled accumulation of massive amounts of data. For instance, data that previously required volumes of books for recordation can now be stored electronically without the expense of printing paper and with a fraction of the physical space needed for storage of paper.

Multiple projects, topics, information sources and other information occurs within a business at any given time. Individuals involved in the project may be aware of only certain aspects of the project, although they should be aware of, and have access to, all aspects of the project. Other individuals, not involved with the project, might at times find the project information useful, especially when there is overlap between projects or when there is a need to acquire information about a particular project. For example, a supervisor might be interested in the status of the project for an upcoming meeting or a co-worker might be brought into the project as a new employee. Thus, it would be beneficial for individuals within the organization to access information on one or more projects without having to waste time searching for the relevant information from coworkers, through various databases, and so on.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with providing cross functionally across applications. An aspect relates to converging various types of data into a different format to allow ease of use of the data as well as more intuitive use of the data. For example, calendar events can be converted into an audio format and listened to as a play list while the user is performing a different function (e.g., getting ready for work, riding a public transportation system). A multitude of data can be put into an audio format mode and the user can consume the information in an audio type of environment.

Another aspect relates to storing all information relating to a particular project on a certain frequency, such as a radio frequency. When a user desires to receive the information relating to a project, the user simply tunes into the project's assigned (e.g., categorized) frequency. Information relating to other projects can be received by tuning into the respective frequencies of those projects.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
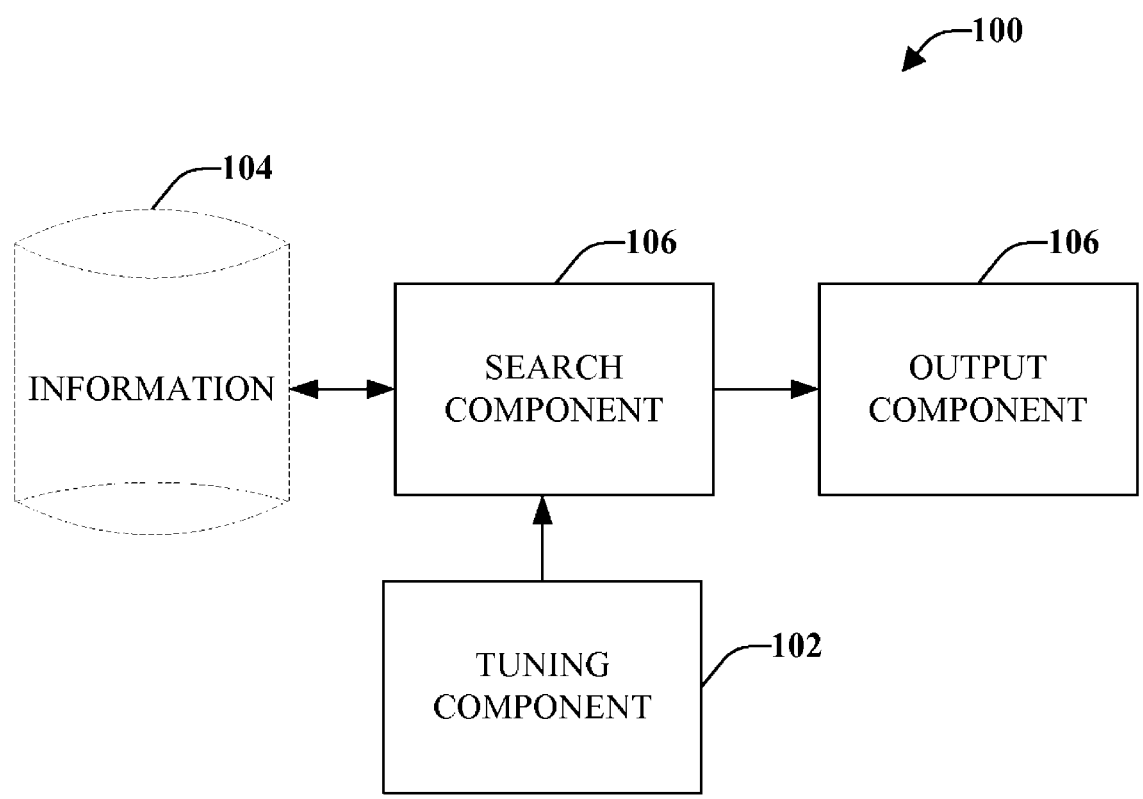
FIG. 1 illustrates an example system that facilitates tuning into content associated with projects.

Referring initially to FIG. 1, illustrated is an example system 100 that facilitates tuning into content associated with projects. There can be a multitude of projects occurring within an organization at substantially the same time. Individuals involved with one or more projects might be involved with some aspects of the projects, but might not know the status of other aspects of the project (e.g., a project is divided among subgroups of employees). There might also be other projects occurring within the organization that might be of interest but in which an individual is not involved. System 100 can facilitate selective tuning or presentation of information relating to one or more projects upon request.

In further detail, system 100 includes a tuning component 102 that receives an indication of a desired subset of categorized information. The received indication can be a function of a user selecting a particular frequency (e.g., radio frequency) assigned to a particular project, function, department, individual and so forth. The categorized information can be maintained in an information repository 104 or another storage medium. As information is collected (e.g., created, discovered, completed) it can be automatically categorized based on content and placed in the information repository 104 by an individual associated with a particular project, another individual responsible for categorizing and maintaining information and/or autonomously by system 100. The information in the repository 104 is information that individuals are willing to share with others.

When a frequency is selected, a search component 106 can be configured to selectively retrieve information relating to the information associated with the project or other item assigned to the frequency. The desired subset of information can be retrieved based on the received indication or based on other criteria. For example, a user might select a first frequency to obtain an overview of the project (e.g., listing of people involved in the project, overall goal, date project was implemented, action items with due dates, individuals responsible for implementing the action items, and so forth). Another frequency, that can be similar to the first frequency, can be selected to obtain information relating to a particular meeting or discussion relating to the project or to obtain other current information. For example, a frequency of "xxx.01" could relate to an overview, "xxx.02" could relate to individuals involved in the project; "xxx.03" could relate to action items, and so forth. In accordance with some aspects, the overall project could be given a particular frequency prefix "xxx" and information after the prefix could relate to the date of concern (e.g., "xxx.04142008" could relate to meetings or other actions that occurred on Apr. 14, 2008). However, other means of establishing a frequency can be utilized, provided individuals that are to access the information are able to do so.

System 100 also includes an output component 108 that can be configured to output the requested information (e.g., based on a received indicator or frequency). The requested information can be presented in various perceivable formats (e.g., visual, audible) or in multiple output formats (e.g., display a small message describing the element and output the audio separately). Output component 108 can facilitate a user selecting a desired portion of the information for play back and can comprise a radio-type interface. For example, output component 108 can provide a play list, such as a selector module or switch, a forward or reverse button and other means (e.g., voice recognition) so that a user can easily navigate through or manipulate the desired content. Controls can be provided that support various functionalities including play/pause/stop, skip forward, skip backward, fast forward, rewind, and so forth. The play list can be similar to a user having a personal radio station. The radio station can be all about the user and the user's interests and it can pull information from data sources in addition to media sources. For example, if information about a meeting is requested, a user can select various agenda items from the meeting, which can be indexed by the agenda items (e.g., broken into subparts).

In accordance with some aspects, the information can be presented by output component 108 as a function of a user device. For example, data can be stored or maintained, such as on a personal computer, and can be converted into an output format. The data can be synchronized or downloaded with a user device (e.g., output device) in a form appropriate for that device (e.g., audio play lists with metadata (text) for each play list element).

In accordance with some aspects, system 100 can convert information from a first format to a second format. For example, if information relating to a project (or any other information) is contained in a document, system 100 can convert the document to an audio format or other format desired by the recipient of the information.

Figure 2:
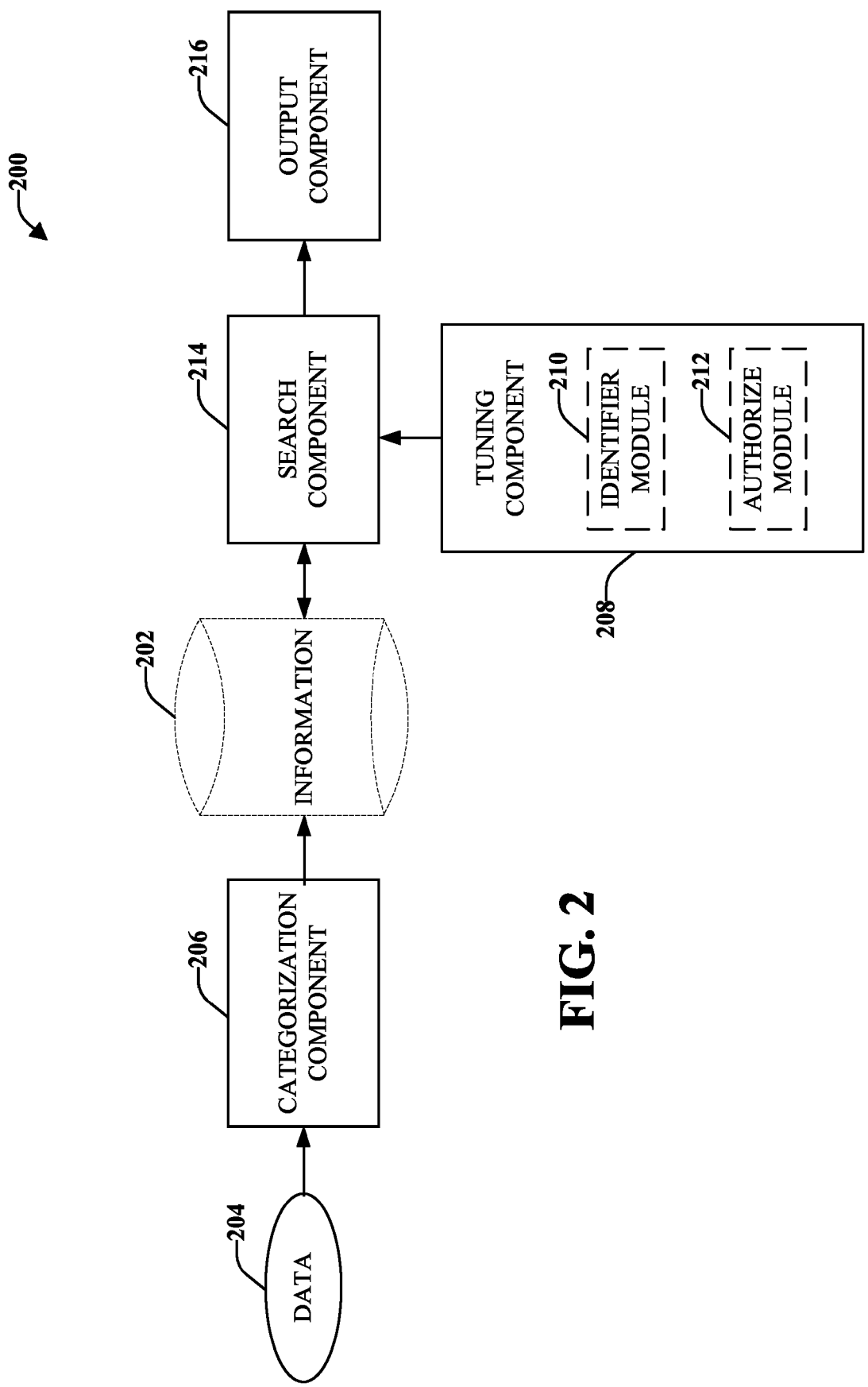
FIG. 2 illustrates an example system for classifying content and selectively presenting the content upon request.

FIG. 2 illustrates an example system 200 for classifying content and selectively presenting the content upon request. There can be a tremendous amount of data or other content generated on a daily basis that relates to one or more meetings or topic areas. As the information is generated, system 200 can automatically classify the content in a logical manner. When system 200 receives a request for the information, it can selectively present the content while taking into account confidentially issues and other concerns.

System 200 includes a database or other storage media 202 that can receive and retain various types of data 204. A categorization component 206 can be configured to classify or group the information according to a topic, subject or other area of interest. The classification or group of incoming data represents categorized information. Categorization component 206 can assign a unique indicator that contains a prefix that groups similar data 204 together. The unique indicator can be a frequency or can correspond to (e.g., be identified with or cross-referenced to) a frequency. Categorization component 204 can place the grouped data in one or more databases.

A user can request data 204 associated with a unique indicator by selecting a frequency or other selection means or indicator, such as by interacting with a tuning component 208. An individual, located within a particular frequency range (e.g., within range of a network (e.g., wide-area network, local-area network, personal area network, and the like) can request information to be broadcast (e.g., wired or wireless) by the network. For example, information in database 202 can be available to individuals located in a particular building or area in range of the network (or connected through wired means).

Some of the categorized data 202 can be accessed by any individual that desires to receive the information. For example, a project relating to increasing effectiveness and teamwork in an organization can be available to each employee, whether such employee is involved in the project or not. As such, an employee that desires the information might be interested in increasing individual effectiveness and, therefore, would like to discover the progress of the project. However, there can be projects that are restricted (e.g., research studies, engineering design projects, and so forth) to individuals directly involved in the project, such as to mitigate competitors or other undesired disclosure of the information.

To mitigate unwanted disclosure, tuning component 208 can include an identifier module 210 that can be configured to receive information relating to a person requesting information. For example, identifier module 210 can receive a unique user name and password pair to authenticate an individual. However, other identification means can be utilized, such as biometrics, retina scan, fingerprint scan, security badge, and so forth.

Tuning component 208 can also include an authenticate module 212 that can be configured to selectively allow the user to access the desired content based on the information received by identifier module 210. Authenticate module can include a listing or obtain information relating to the user name/password pair upon a request for information. If the user is not authorized, an error message can be sent to the individual with a notification that access is denied. If the user is authorized, a search component 212 can be configured to obtain the requested information from database 202, which can be presented to the user in various formats by output component 214.

Figure 3:
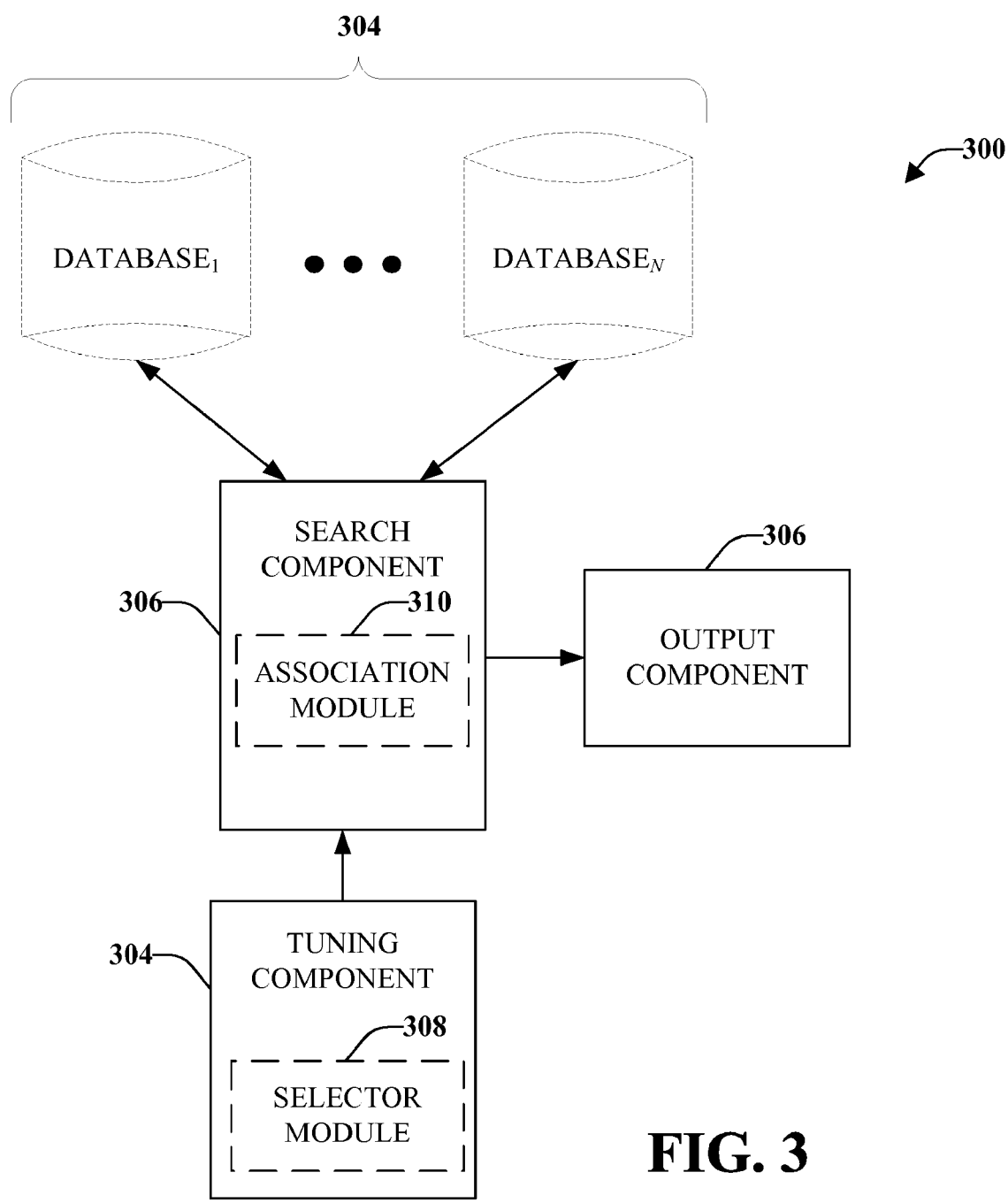
FIG. 3 illustrates an example system that facilitates radio-type interface for tuning into content associated with projects.

With reference now to FIG. 3, illustrated is an example system 300 that facilitates radio-type interfaces for tuning into content associated with projects. System 300 can employ a radio-type interface or another type of interface to allow a user to receive content on a user device. The content can be associated with different projects that are of interest to the user.

System 300 is similar to the systems shown and described with reference to the above figures. System 300 includes a tuning component 302 that can allow a user to select a reference (e.g., a frequency) in order to receive content relating to one or more projects. Information pertaining to the projects can be maintained in a single database or in separate databases or storage medias. As illustrated, system 300 can be associated with 1 to N databases, where N is an integer. Databases 1 to N can be referred to individually or collectively as databases 304 and can contain information relating to different or similar projects.

By way of example, and not limitation, databases 304 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

At substantially the same time as a reference or other identifier is received by tuning component 302, a search component 306 can selectively access one or more databases 304 for information relating to the requested information. Information retrieved from the databases 304 can be presented, in response to the request, by output component 306.

To assist a user in requesting particular information, tuning component 302 can include a selector module 308 that can provide selectable tuning. For example, the user can select a prefix of an identifier for a particular project. Through interaction with selector module 308 the user can index through various information associated with the project (e.g., overview, meeting, documents, and so forth). In accordance with some aspects, selector module 308 can produce an audio, visual, or both audio and visual, interface that provides the user with information relating to the selection. For example, as the user indexes through the content, selector module 308 can provide information relating to that index (e.g., "Overview of Century Project", "Meeting of December 17", and so forth). Tuning module 302 and/or selector module 308 can receive the request in various formats (e.g., natural language input, text entry and so forth).

Search component 306 can include an associate module 310 that links the selected input or index with the information contained in the databases 304. For example, as a user tunes into or enters a frequency or reference, associate module 310 can correspond the request with one or more information sources that might be cross-referenced or otherwise associated with the request.

Figure 4:
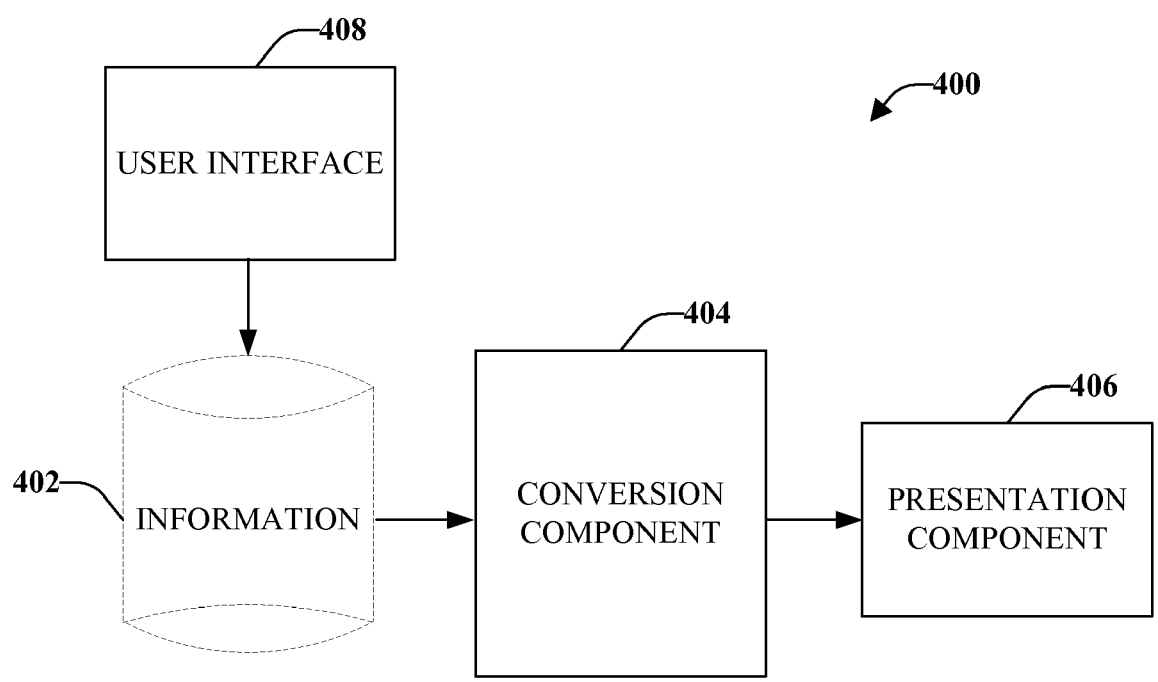
FIG. 4 illustrates an example system that provides cross functionality across applications.

FIG. 4 illustrates an example system 400 that provides cross functionality across applications. System 400 can facilitate converging data that is in multiple formats into a single format. The various data can be requested utilizing a tuning component or other means of requesting the information 402. A request for the information might include a request that the information is output in a particular format (e.g., audibly, visually, and so forth) and/or as a function of a user device.

A conversion component 404 can be configured to change the requested information prior to outputting the information 402 to the user through presentation component 406. If the information 402 is already in the requested format, conversion module 404 does not need to change the format. However, if the information is in a different format, conversion module 404 can selectively convert the entire file or subsets of the file into the desired format. For example, if content associated with a user's activities for the day (e.g., calendar) is requested and the user would like the information audibly, conversion component 404 can selectively convert the meeting information (e.g., time of meeting, subject matter of meeting) to an audible format. Additional information can also be presented to the user in an audible format, such as individuals invited to the meeting, information the user is to present at the meeting, and so forth.

A user interface 408 can be included in system 400 to facilitate requesting the information and/or a desired format. User interface 408 can provide a graphical user interface (GUI), a command line interface, a speech interface, Natural Language text interface, and the like. For example, a GUI can be rendered that provides a user with a region or means to load, import, select, read, etc. the desired information and a desired format, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

System 400 can provide cross functionally across applications by converging various types of data into a different format to allow ease of use of the data as well as more intuitive use of the data. For example, calendar events can be converted into an audio format and listened to as a play list while the user is performing a different function (e.g., getting ready for work, riding a public transportation system). A multitude of data can be put into an audio format mode and the user can consume the information in an audio type of environment.

Figure 5:
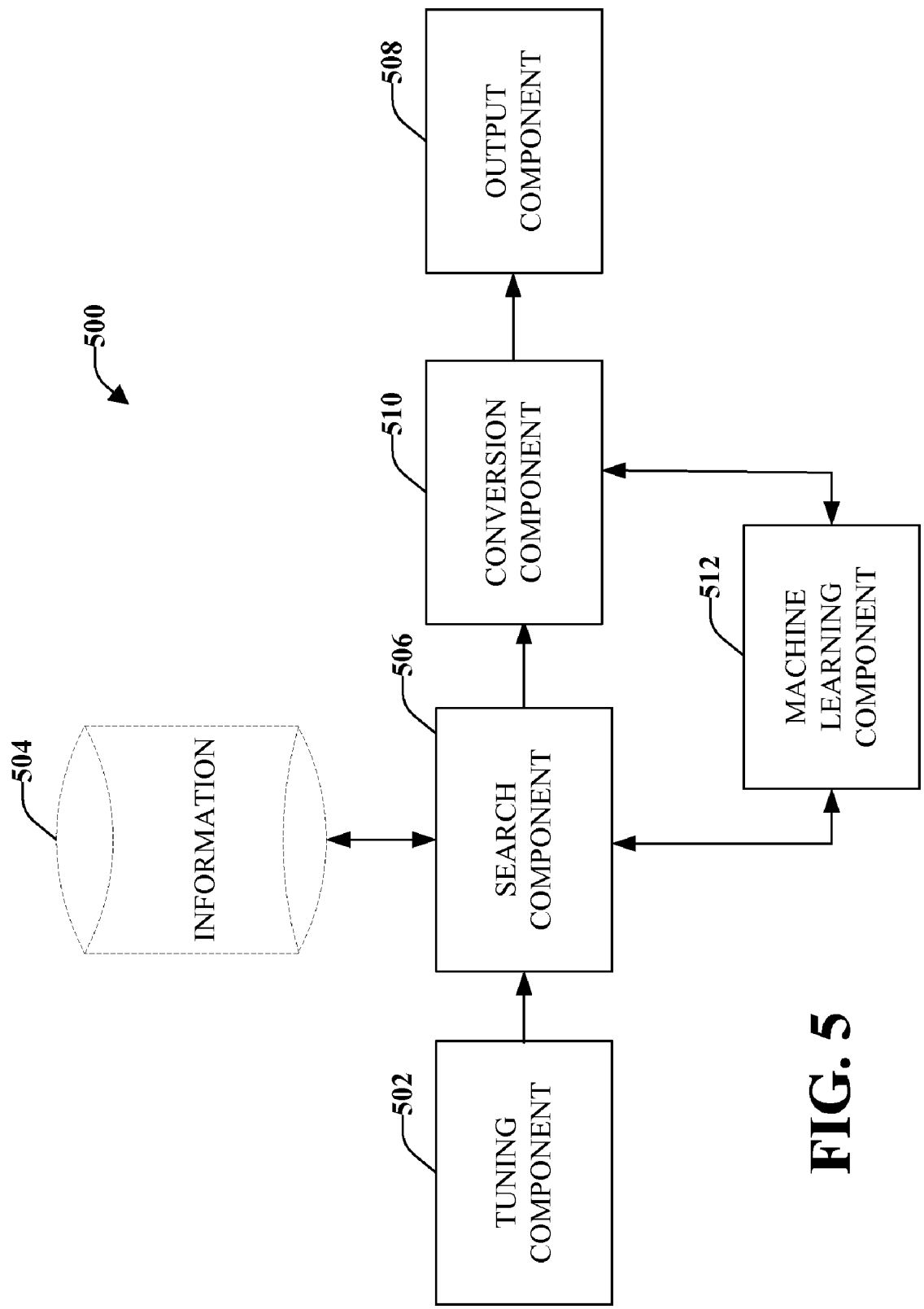
FIG. 5 illustrates an example system that employs machine learning to automate one or more of the disclosed features.

FIG. 5 illustrates an example system 500 that employs machine learning to automate one or more of the disclosed features. System 500 includes a tuning component 502 that can receive a user request for various information 504. The request can include a selection, such as a frequency or other indicator of the desired content. Based on the frequency or other indicator, search component 506 can selectively locate the information 504 to be presented to the user through output component 508. In accordance with some aspects, the information is converted into a user desirable format (e.g., audio, visual, and so forth) by conversion component 510 prior to being presented to the user.

System 500 can also include a machine learning component 512 that can employ various schemes (e.g., artificial intelligence, rules based logic) for carrying out various aspects. For example, a process for determining how to classify data to be stored in a database or other storage media can be facilitated through an automatic classifier system and process. Such content can relate to important sections of a document, based on a received request or an annotation. In accordance with one or more aspects described herein, inferences can be made regarding assigning a reference or frequency to different portions of a project, determining if a user can receive information relating to a project, converting a file or other item to a user requested format and so forth. Inferences can also be made relating to presenting the information in a format as a function of a user device.

As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Artificial intelligence based systems (e.g., explicitly and/or implicitly trained classifiers), rules-based logic systems or other machine learning techniques can be employed in connection with performing inference and/or probabilistic determinations and/or statistical-based determinations as in accordance with one or more of the disclosed aspects.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to convert data to a different format, how to classify information to a particular frequency, etc. The criteria can include, but is not limited to, the amount of data or resources associated with a single frequency, the type of data, the importance of the data, etc.

According to an example, one or more aspects presented above can include making inferences pertaining to selectively presenting information to a user based on a received request. In accordance with another example, an inference can be made related to whether categorizing data and/or associating different content should be performed. It will be appreciated that the foregoing examples are illustrative in nature and are not intended to limit the number of inferences that can be made or the manner in which such inferences are made in conjunction with the various aspects described herein.

Figure 6:
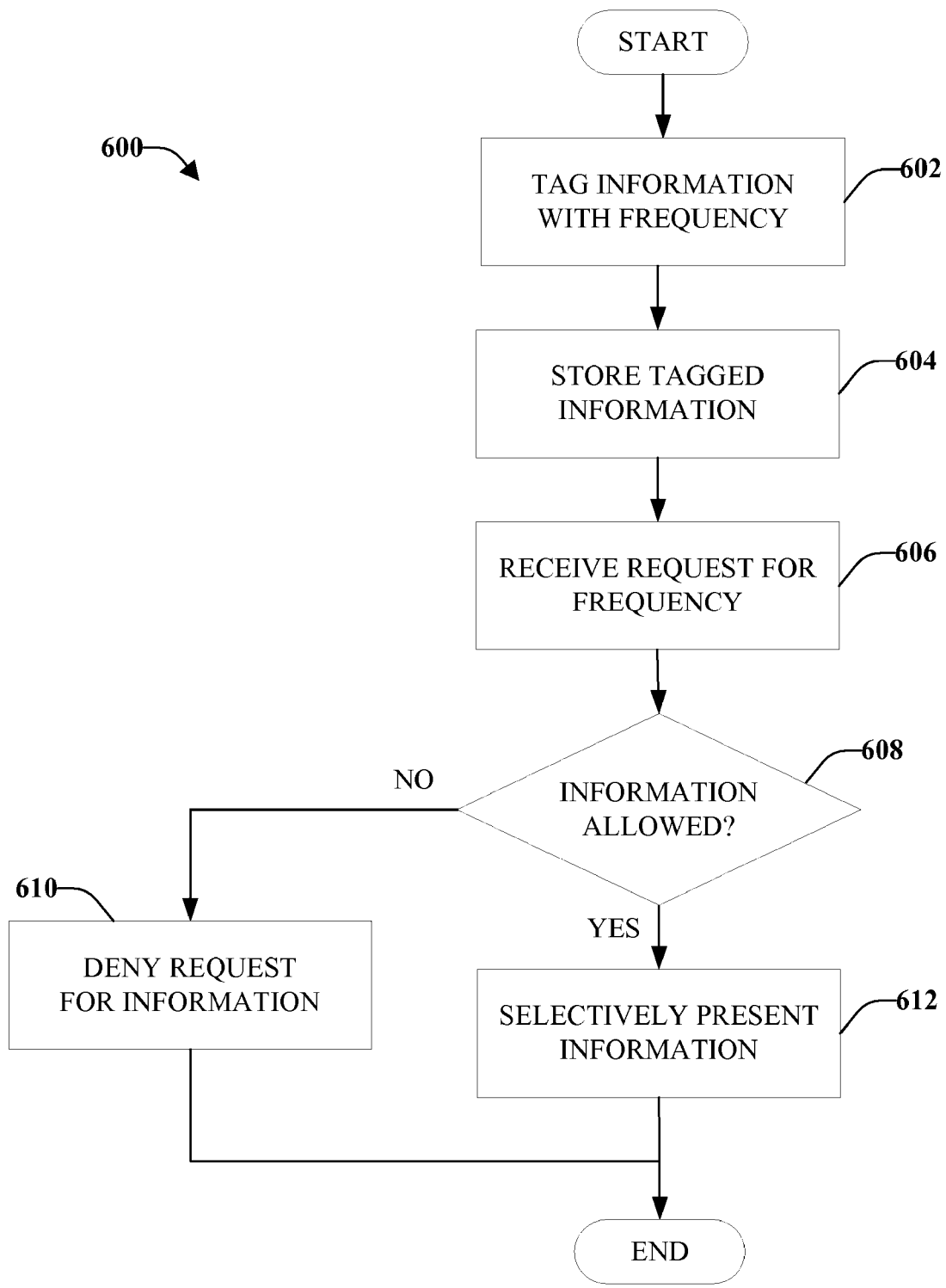
FIG. 6 illustrates a method for selectively presenting information to a user based on a received request.
Figure 7:
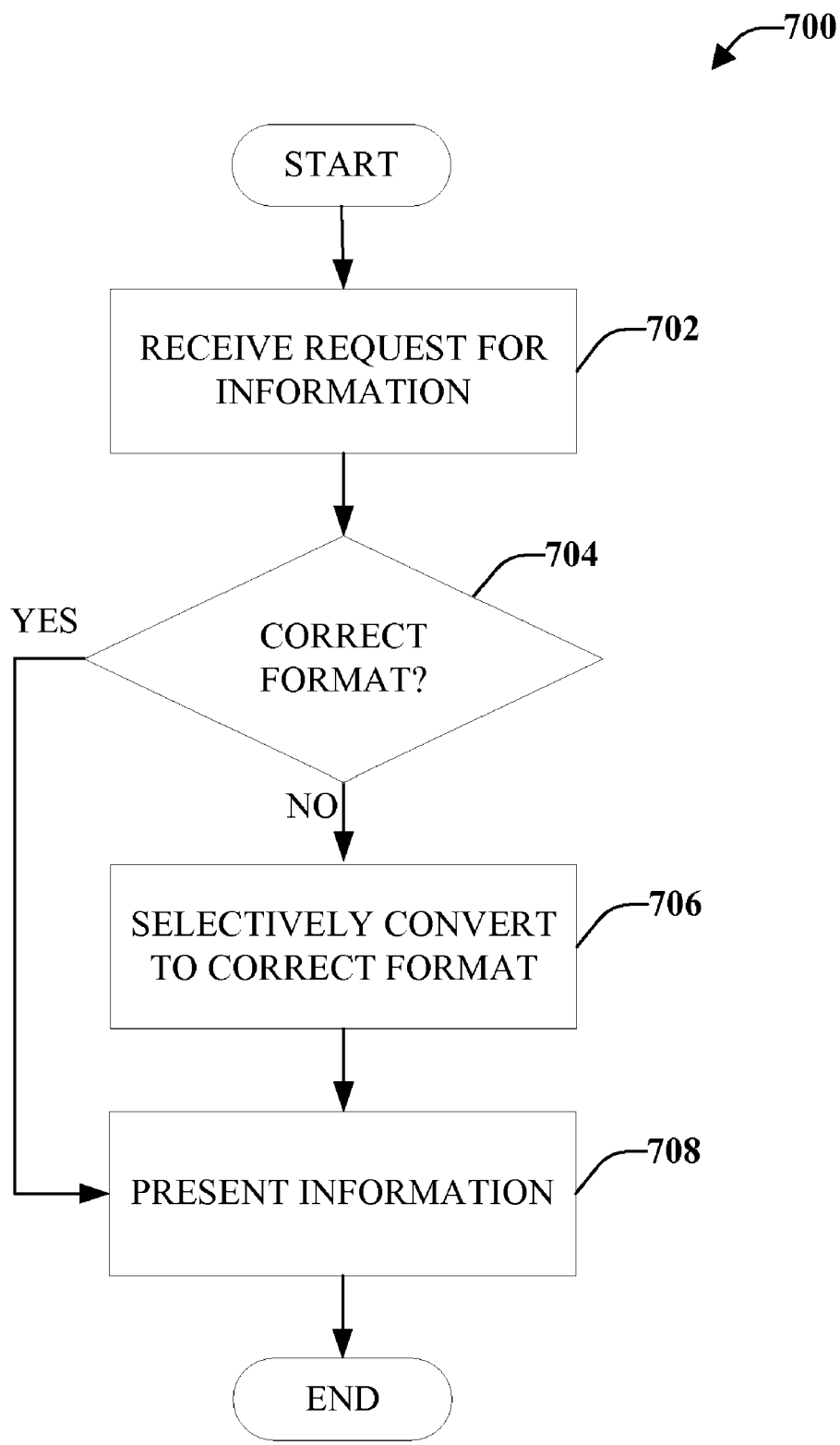
FIG. 7 illustrates a method for outputting information to a user in a requested format.
Figure 8:
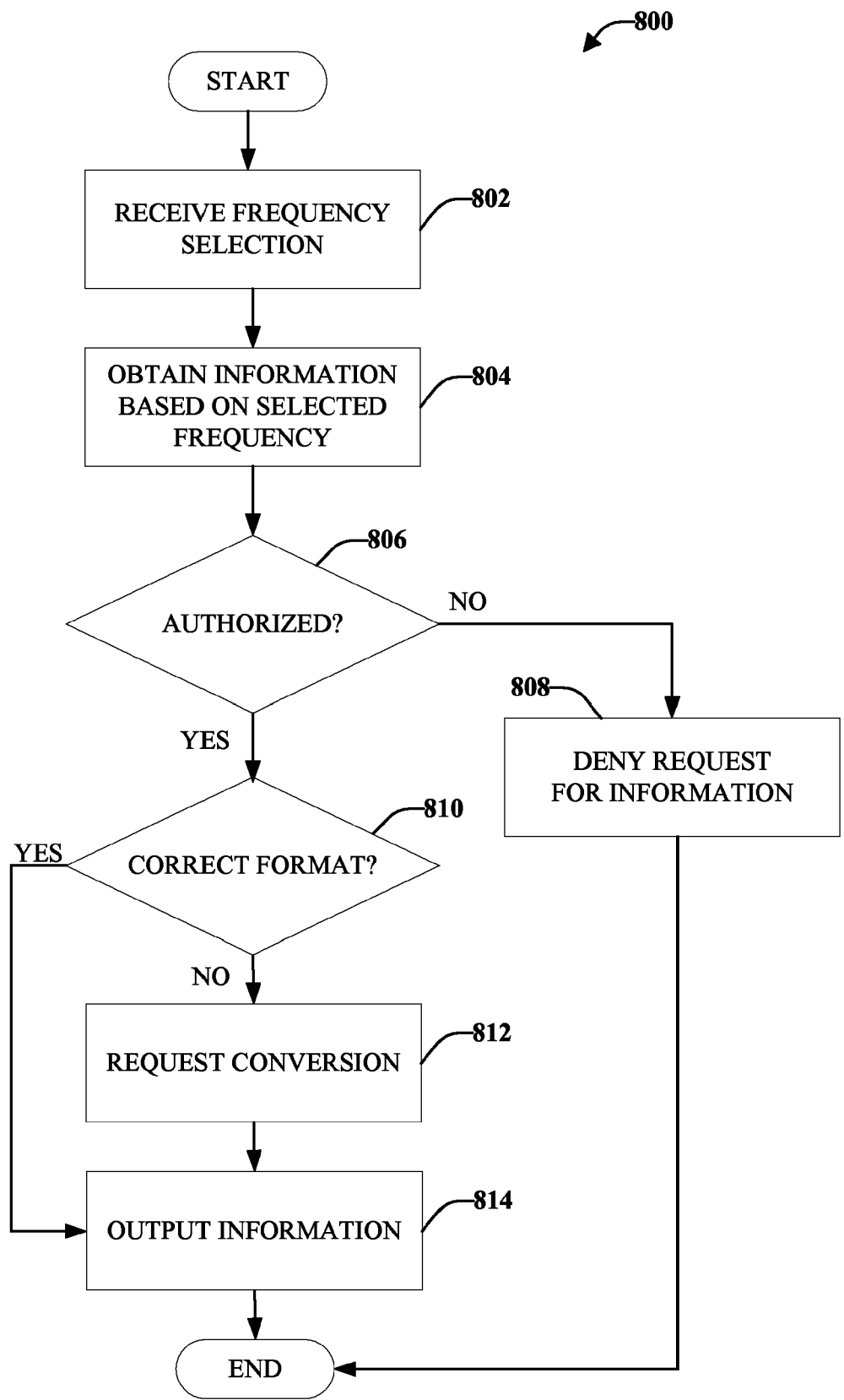
FIG. 8 illustrates another method for presenting a user with information in a requested format.

In view of the exemplary systems shown and described above, methodologies that may be implemented in accordance with the disclosed subject matter, will be better appreciated with reference to the flow charts of FIGS. 6-8. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 6 illustrates a method 600 for selectively presenting information to a user based on a received request. The information can be presented to an authorized individual and in a desired format. Method 600 starts, at 602, when information is tagged with a frequency indicator. The tagged information can be associated with a single project or similar projects. For example, the tagged information can relate to meetings, conversations, documents or other items associated with a project. At 604, the tagged information is stored in a readily retrievable format and can be maintained as audio data or visual data, depending on how the information was created.

A request for information relating to a particular frequency is received, at 604. This request can be received by a user tuning a mobile device (or other computing device) into a particular frequency or range of frequencies. The user might also enter a user identification, such as a user name and password pair, or other identification information (e.g., biometrics, security badge, and so forth).

Based in part on the received user indication, a determination is made, at 606, whether the user is authorized to view the content associated with the selected frequency. If the user is not authorized to view the information ("NO") because the information is restricted, an error message or other message can be communicated to the user stating that the request for information is denied. If the user is authorized to receive the information ("YES"), the information is presented to the user in a format in which it was created, or it can be converted to the requested format and/or a format applicable to the user device (e.g., functionalities supported by the device).

FIG. 7 illustrates a method 700 for outputting information to a user in a requested format. At 702, a request for information is received. The request can be a common request for information (e.g., open a file, show a calendar, and so forth) or it can be a request to receive associated information by tuning a device (e.g., a radio type interface) into a particular frequency related to the desired content.

The request for information received, at 702, can also include a request that the retrieved information be presented to the user in a common format (e.g., audio). At 704, a determination is made whether the content is in the requested format. If the information is in the requested format ("YES"), it is presented to an authorized user, at 708. If the information is not already in the requested format ("NO") it is dynamically changed to the requested format.

FIG. 8 illustrates another method 800 for presenting a user with information in a requested format. An organization or enterprise can maintain a business radio type interface. For example, the company can have hundreds or thousands of frequencies and each frequency can be related to a specific topic, group or individual. Thus, a user can tune into a frequency of interest and can receive the content associated with the topic, group and/or individual (emails, conversations, instant messages, whatever people are willing to publish). The frequencies can employ a cognitive office application that allows individuals that are seamlessly moving between applications and communication modalities to optimize an information worker experience.

At 802, a frequency selection is received. In conjunction with the frequency selection, a user might also include a format selection (e.g., all content should be in an audio format or in two or more format types). The frequency selection can be made by a user entering a specific frequency into a device and/or by indexing through various frequencies to find a desired content. Information relating to the selected frequency is retrieved, at 804. The information retrieval might include determining if the user is authorized, at 806, to receive the information or if the information is restricted. If the user is not authorized ("NO") an error message or other message denying the content is received, at 808.

If the user is authorized, at 810, a determination is made whether the information is in the desired format. If the information is not in the requested format ("NO"), a request to convert the information can be sent, at 812, after the conversion, the information can be presented to the user, at 814. If the information is in the requested format ("YES"), the information is dynamically presented to the user, at 814.

Figure 9:
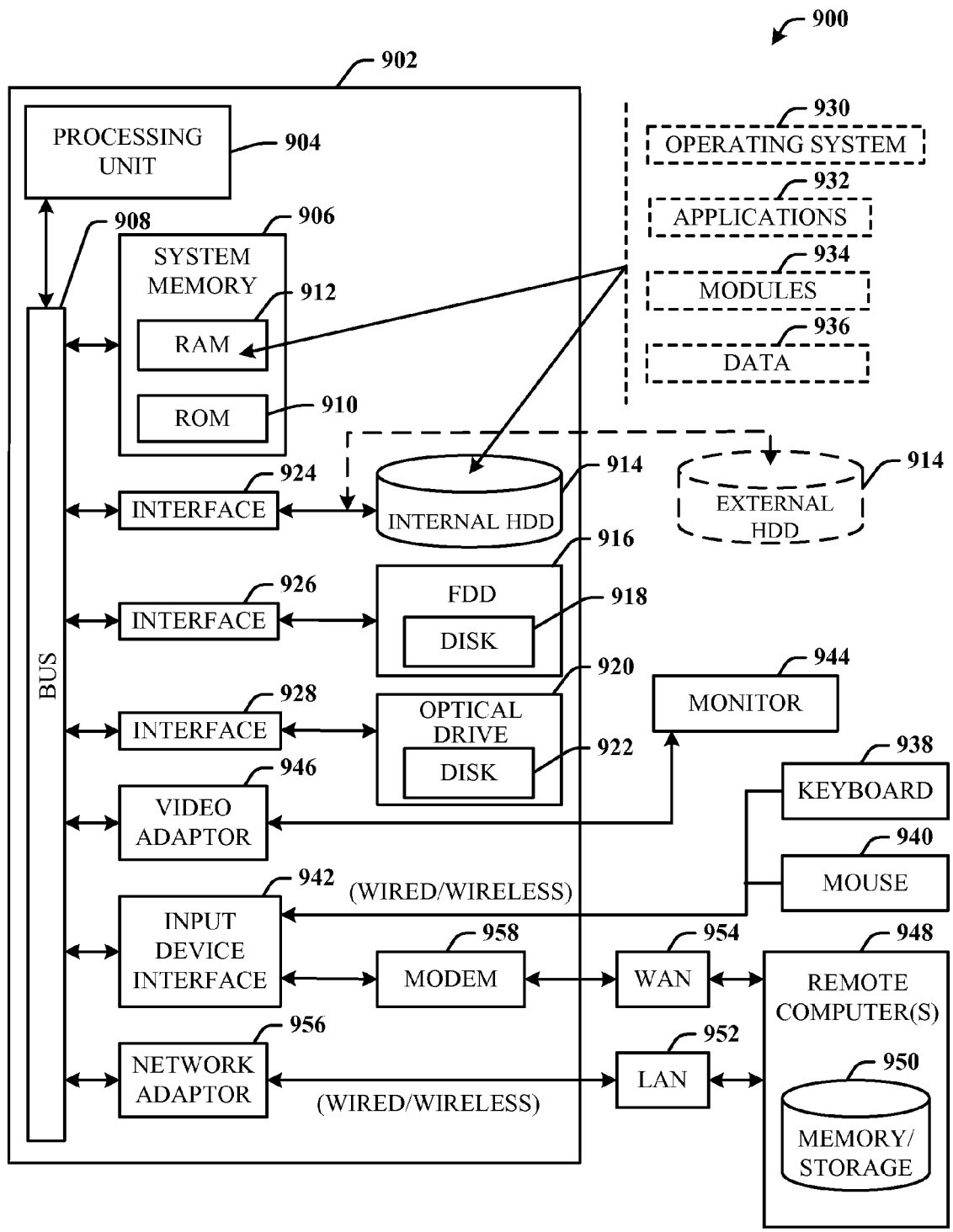
FIG. 9 illustrates a block diagram of a computer operable to execute the disclosed aspects.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 10:
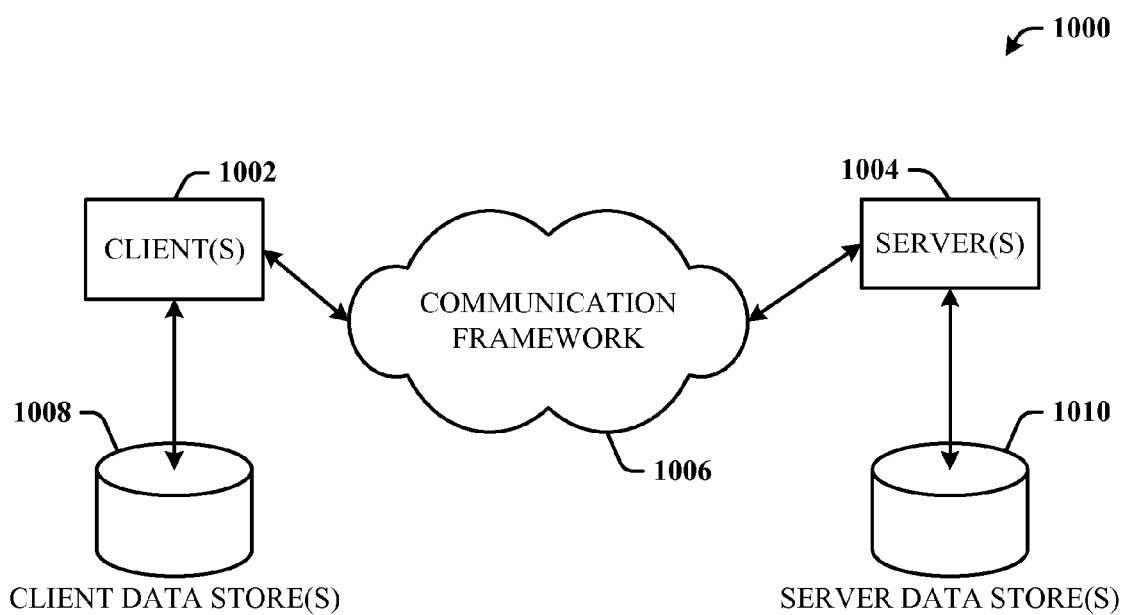
FIG. 10 illustrates a schematic block diagram of an exemplary computing environment operable to execute the disclosed aspects.

Referring now to FIG. 10, there is illustrated a schematic block diagram of an exemplary computing environment 1000 in accordance with the various aspects. The system 1000 includes one or more client(s) 1002. The client(s) 1002 can be hardware and/or software (e.g., threads, processes, computing devices). The client(s) 1002 can house cookie(s) and/or associated contextual information by employing the various aspects, for example.

The system 1000 also includes one or more server(s) 1004. The server(s) 1004 can also be hardware and/or software (e.g., threads, processes, computing devices). The servers 1004 can house threads to perform transformations by employing the various aspects, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system for providing information in a tunable format, comprising:
one or more processors; and
memory storing instructions executable by the one or more processors, the memory storing:
an information repository to maintain categorized an organization's project information;
a tuning component with selector module to receive an indication of a desired project subset of the categorized organization's project information;
a search component that obtains the desired project subset of the organization's project information based on the received indication;
a conversion component to selectively convert a non-audio format of a subset of the organization's project information to an audio format;
a machine learning component to automatically categorize the organization's project information based on the organization's project content of a plurality of the organization's projects occurring substantially within a same period of time, determine if a user can receive the subset of the organization's project information, and determine to convert the subset of the organization's project information to an audio format; and an output component comprising a radio-type interface to present the audio format of the subset of the organization's project information in response to the received indication.

2. The system of claim 1, further comprising a categorization component that assigns a unique indicator to similar data of the categorized information.

3. The system of claim 2, the categorization component assigns the unique indicator that contains a prefix to groups of similar data.

4. The system of claim 1, the output component presents the project subset of information in a format that is a function of a user device.

5. The system of claim 1, further comprising:
an identifier module that receives user information; and
an authenticate module that selectively allows data to be accessed by a user based on the received user information.

6. The system of claim 5, the authenticate module denies access to the data if the user is not authorized to view the data.

7. The system of claim 1, the output component provides a play list to allow a user to manipulate the data.

8. The system of claim 1, wherein the output component presents the project subset of information in multiple formats.

9. A method for selectively presenting an organization's project information to a user of the organization based on a received request, comprising:
receiving a request for an audio format of a subset of the organization's project information based on a selected channel frequency of a plurality of channel frequencies;
determining that the user is authorized to receive the subset of the organization's project information;
determining that the subset of the organization's project information is not in the audio format;
converting the subset of the organization's project information to the audio format; and
selectively presenting the subset of the organization's project information to the user on a radio-type interface responsive to determining that the user is authorized to receive the organization's project information;
wherein a machine learning component automatically assigns a channel frequency to differing projects occurring within the organization at substantially a same period of time, determines if a user can receive the subset of the organization's project information, and determines to convert the subset of the organization's project information to an audio format.

10. The method of claim 9, determining that the user is authorized to receive the information comprises:
receiving a user identification; and
comparing the user identification with individuals authorized to receive the data.

11. A computer-implemented system for selectively presenting data to a user, comprising:
one or more processors; and
memory storing instructions executable by the one or more processors, the memory storing:
a categorization component for associating an organization's project content with a plurality of projects and assigning a channel frequency prefix to each project;
a tuning component with a selector module to receive (1) a request that includes a channel frequency to receive a subset of the associated content comprising a calendar format or a text document, and (2) a second request for the subset of the associated content comprising the calendar format or the text document to be presented in an audio format;
a conversion component to selectively convert the subset of the associated content comprising the calendar format or the text document to the audio format;
a machine learning component to automatically categorize the organization's project content based on the plurality of the organization's projects, determine if a user can receive the subset of the organization's project information, and determine to convert the subset of associated content comprising the calendar format or the text document to an audio format; and
an output component comprising a radio-type interface to selectively present the subset of the associated content comprising the calendar format or the text document to an authorized user.

* * * * *